US005081369A

United States Patent [19]
Tsuzuki et al.

[11] Patent Number: 5,081,369
[45] Date of Patent: Jan. 14, 1992

[54] SIGNAL PROCESSING CIRCUIT WITH DIGITAL DELAY

[75] Inventors: Mitsuo Tsuzuki; Toshio Shiramatsu, both of Yokohama, Japan

[73] Assignee: Kabushiki Kaisha Toshiba, Kawasaki, Japan

[21] Appl. No.: 545,139

[22] Filed: Jun. 27, 1990

Related U.S. Application Data

[63] Continuation of Ser. No. 159,393, Feb. 23, 1988, abandoned.

[30] Foreign Application Priority Data

Feb. 25, 1987 [JP] Japan ................... 62-40025

[51] Int. Cl.$^5$ .................. H03K 5/00; H03K 5/13; G06G 7/12; H03B 19/00
[52] U.S. Cl. .................. 307/261; 307/494; 307/605; 328/13; 328/28
[58] Field of Search ............ 328/13, 28; 307/261, 307/490, 494, 605, 608, 496; 340/347 A, 347 D; 360/32; 358/22, 37

[56] References Cited

U.S. PATENT DOCUMENTS

| | | | |
|---|---|---|---|
| 3,810,232 | 5/1974 | Aghazadeh | 340/174.1 H |
| 4,068,136 | 1/1978 | Minami | 307/494 |
| 4,091,379 | 5/1978 | Wu et al. | 328/28 |
| 4,110,745 | 8/1978 | Ninomiya | 340/347 AD |
| 4,122,490 | 10/1978 | Lish | 358/22 |
| 4,183,051 | 1/1980 | Richman | 358/37 |
| 4,222,008 | 9/1980 | Mezrich | 328/28 |
| 4,613,973 | 9/1986 | Dahl | 307/261 |

FOREIGN PATENT DOCUMENTS

3604723A1 10/1986 Fed. Rep. of Germany.

OTHER PUBLICATIONS

EPO Search Report, EP 88 10 2740, dated 4/26/89.
"The Use of Delay Lines in Reading a Manchester Code", T. H. Chen, IEEE Transactions on Computers, vol. C-17, No. 9, Sep. 1968, pp. 827-845.
Abstract, K. Oota, vol. 10, No. 374 (P-527)(2431), Dec. 12, 1986, "Magnetic Recording and Reproducing Device".
Abstract, t. Furukawa, vol. 7, No. 262 (P-238)(1407), Nov. 22, 1983, "Reading System of Magnetic Recording Device".

Primary Examiner—Stanley D. Miller
Assistant Examiner—Trong Phan
Attorney, Agent, or Firm—Finnegan, Henderson, Farabow, Garrett and Dunner

[57] ABSTRACT

A signal processing circuit has a differential circuit for differentiating an analog signal and a comparator circuit for converting the signal output from the differential circuit into a digital signal. The signal processing circuit is characterized by further comprising a delay circuit for delaying the converted digital signal by a predetermined period of time. In the signal processing circuit of the present invention, the analog signal is first differentiated and digitized, and then, finally, delayed by the digital delay circuit. With such an arrangement, analog filters can be dispensed with, thus enabling most of the signal processing circuit to be built into the IC circuit, and to be of more simple design.

6 Claims, 4 Drawing Sheets

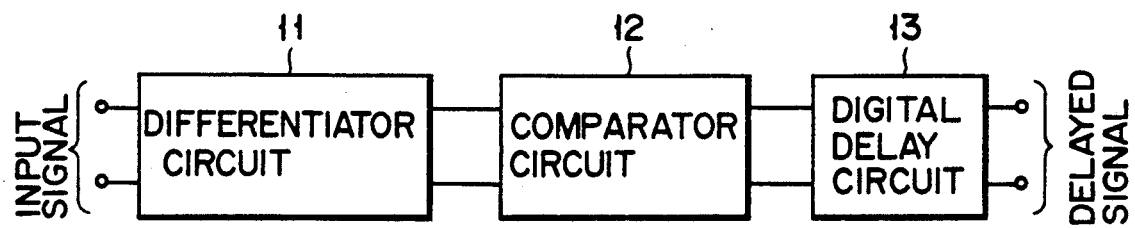
FIG. 3
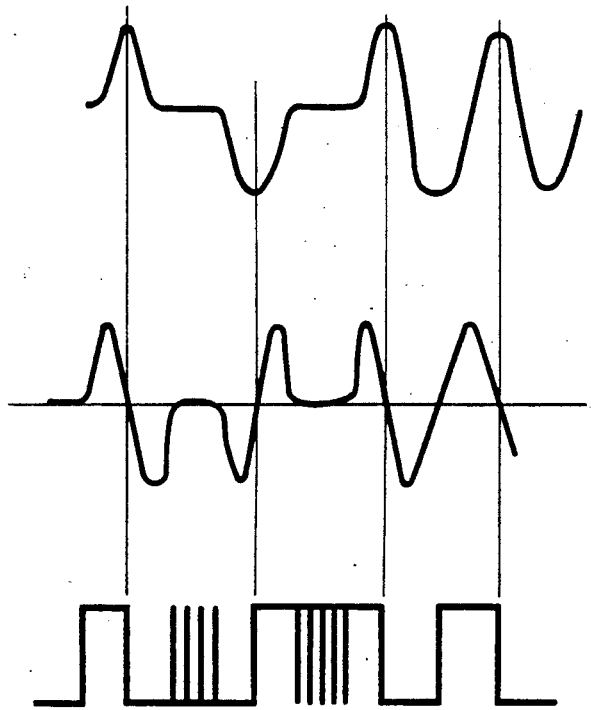
FIG. 4A
FIG. 4B
FIG. 4C
FIG. 4D

SIGNAL PROCESSING CIRCUIT WITH DIGITAL DELAY

This application is a continuation of application Ser. No. 159,393, filed Feb. 23, 1988, and now abandoned.

BACKGROUND OF THE INVENTION

1. Field of the Invention

This invention relates to a signal processing circuit used in detecting peaks of pulse signals read out from a magnetic head of a hard disk device.

2. Description of the related art

Many methods exist for removing pseudo peaks—which arise from noise, for example—from a read-out signal output via the magnetic head of a hard disk device. Typical pseudo peak removal methods are the time domain system, the level-slice system, the minute voltage system, also called the Δ (delta)·V system, and the like. In the case of the ΔV system, for example, the true peak level of an original waveform is used as a reference level, with those peaks below the reference level being treated as pseudo peaks and therefore removed. Because this system is free from the problem of the amplitude limit of the original waveform, it has, accordingly, found widespread application, from MFM modulation to RLL modulation.

When using the ΔV system, the peak position of the read-out signal from the magnetic head must be delayed a predetermined period of time; conventionally, the read-out signal is subjected to the delay processing in the analog signal mode.

A prior signal processing circuit based on the ΔV system, is shown in FIG. 1, while signal waveforms at key points in this circuit are shown in FIG. 2. A read-out signal A from the magnetic head is delayed a predetermined time of period by analog delay circuit 61, which includes an LCR type filter. Signal A then becomes delayed signal B which, in turn, is differentiated by differentiator circuit 62. The resulting differentiated signal C is then supplied to comparator 63, where it is converted into a digital signal D. Finally, signal E corresponding to the write data is reproduced by use of digital signal D.

Using an analog circuit for signal delay presents the following problems:

In order to expand the frequency range in which the signal can be read out, it is necessary to provide a large number of filters in the signal processing circuit. When a large number of filters is provided in the signal processing circuit, it is necessary to provide a large number of external LCR elements on the wiring board, leading to the signal processing circuit of undesirably large size.

As is clear from the above, in the signal processing circuit based on the ΔV system for pseudo peak removal, the entire circuitry cannot be fabricated into a circuit with a high packing density. This creates many problems, such as higher manufacturing costs, a large number of required external elements, a large chip area occupied by the signal processing circuit, and difficultly in design work of the circuit.

SUMMARY OF THE INVENTION

Accordingly, an object of this invention is to provide a signal processing circuit based on the ΔV system, which can be assembled into an integrated circuit with a high packing density, and which can provide an easy circuit design.

A signal processing circuit according to this invention comprises differentiating means for differentiating an analog signal, means for converting the output signal from the differentiating means into a digital signal, and digital delay means for delaying the converted digital signal by a predetermined period of time.

An analog signal input into the signal processing circuit is first differentiated, then digitized, and, finally, is delayed by the digital delay means.

Since this arrangement dispenses with need for analog filters, most of the signal processing circuit can therefore be built into the IC circuit; thus, a signal processing circuit of simpler design can be realized.

BRIEF DESCRIPTION OF THE DRAWINGS

FIG. 3 shows a block diagram of a signal processing circuit according to one embodiment of this invention;

FIG. 4a-d shows signal charts of the FIG. 3 circuit;

DETAILED DESCRIPTION OF THE PREFERRED EMBODIMENTS

A preferred embodiment of the invention will be described, with reference to the accompanying drawings.

A signal processing circuit according to an embodiment of this invention is shown in FIG. 3, with signal waveforms at key points in this circuit being shown in FIG. 4.

A read-out signal a from the magnetic head is differentiated by differentiator circuit 11. The resulting differentiated signal b is supplied to differential type comparator 12, where it is converted into a digital signal c. Finally, signal d corresponding to the write data is reproduced using this digital signal d.

Figures 1, 2A, 2B, 2C, 2D, 2E:
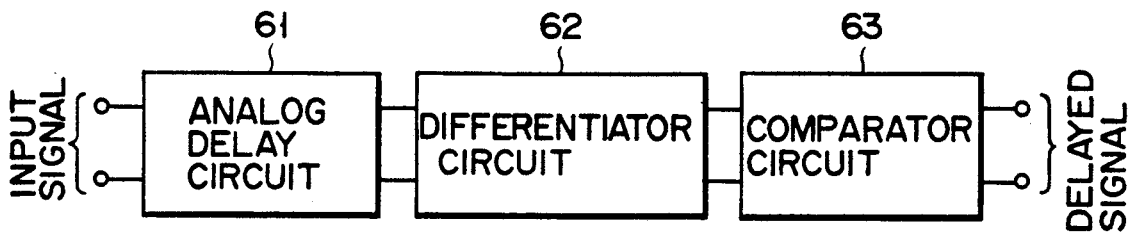
FIG. 1 shows a block diagram of a prior signal processing circuit.
FIG. 2a-e shows signal charts of the FIG. 1 signal processing circuit.
Figure 5:
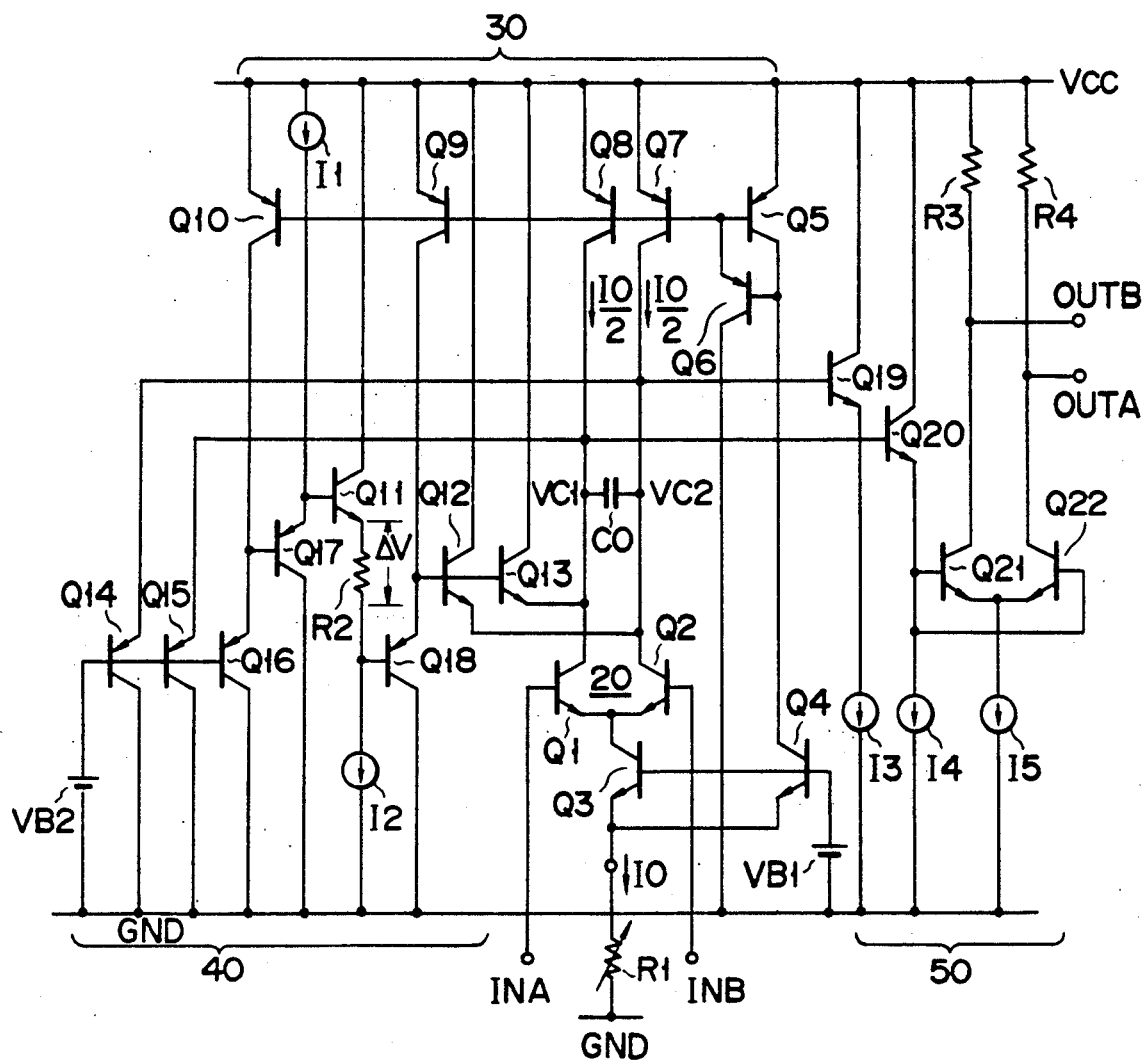
FIG. 5 is a circuit diagram of an analog delay circuit incorporated in the signal processing circuit of FIG. 1.

FIG. 5 shows a detailed circuit diagram of a delay circuit used in the signal processing circuit described above. The signals input into this delay circuit, i.e., the output signals from comparator 12, are complementary signals INA and INB. Signal INA is supplied to the base of NPN transistor Q1, and signal INB, to the base of NPN transistor Q2. Transistors Q1 and Q2 are interconnected at their emitters and form a differential amplifier 20 for amplifying signals INA and INB. Located between and connected to the collectors of transistors Q1 and Q2 is capacitor CO. Differential amplifier 20 charges and discharges capacitor CO according to the levels of input signals INA and INB. Bias voltage source VB1, resistor R1, PNP transistors Q3 and Q4, and NPN transistors Q5 to Q10 make up constant current source 30. Circuit 30 supplies a constant current IO to the emitters of transistors Q1 and Q2, and a constant current IO/2 to transistors Q8 and Q9, the collectors of which are connected to the respective terminals of capacitor CO. The values of currents IO and IO/2 can be adjusted by varying the resistance value of resistor R1.

Bias voltage source VB2, resistor R2, NPN transistors Q11, Q12, and Q13, PNP transistors Q14 to Q18, and constant current sources I1 and I2 make up clamp circuit 40. Clamp circuit 40 limits the voltage across capacitor CO to the voltage drop ΔV across resistor R2, which is caused by constant current I2.

Resistors R3 and R4, NPN transistors Q19 to Q22, and constant current sources I3 to I5 make up a differential type converter 50. Converter 50 amplifies the voltage across capacitor CO, waveshapes it, and produces complementary signals OUTA and OUTB. It should be noted that the circuit shown in FIG. 5, except for variable resistor R1 thereof, can entirely be formed in a form of an integrated circuit.

The base of NPN transistor Q1 receives input signal INA, and the base of NPN transistor Q2 receives input signal INB. The collector of NPN transistor Q1 is connected to the collector of PNP transistor Q8, the emitter of which is connected to positive power supply Vcc. The collector of NPN transistor Q2 is connected to the collector of PNP transistor Q7, the emitter of which is connected to positive power supply Vcc. The emitter of NPN transistor Q1 is connected to the emitter of NPN transistor Q2.

The node of the emitters of NPN transistors Q1 and Q2 is connected to the collector of NPN transistor Q3, the emitter of transistor Q3 being connected to the ground via variable resistor R1. The base of NPN transistor Q3 is connected to the base of NPN transistor Q4. The bases of NPN transistors Q3 and Q4 are connected to the positive polarity terminal of bias voltage supply VB1. The negative polarity terminal of bias voltage supply VB1 is connected to the ground. The emitter of NPN transistor Q4 is connected to the ground via variable resistor R1, and its collector is connected to the collector of PNP transistor Q5. The emitter of PNP transistor Q5 is connected to positive power supply Vcc.

The base of PNP transistor Q6 is connected to the collector of NPN transistor Q4, its emitter is connected to the base of PNP transistor Q5, and its collector is connected to the ground.

The collector of NPN transistor Q1 is also connected to the emitter of NPN transistor Q13, and the collector of NPN transistor Q2 is also connected to the emitter of NPN transistor Q12. The collectors of NPN transistors Q12 and Q13 are connected to positive power supply Vcc, the bases of transistors Q12 and Q13 being connected to the emitter of NPN transistors Q18. The collector of PNP transistor Q18 is connected to the ground. The emitter of PNP transistor Q18 is connected to the collector of PNP transistor Q9, the emitter of which is connected to positive power supply Vcc. The base of PNP transistor Q18 is connected to the ground via current source I2, as well as to the emitter of NPN transistor Q11, via resistor R2. The collector of NPN transistor Q11 is connected to positive power supply Vcc, and its base is connected to positive power supply Vcc via current source I1. The base of NPN transistor Q11 is also connected to the emitter of PNP transistor Q17. The collector of transistor Q17 is connected to the ground, and its base is connected to the collector of PNP transistor Q10, the emitter of which is connected to positive power supply Vcc. The collector of PNP transistor Q10 is also connected to the emitter of PNP transistor Q16, the collector of which is connected to the ground, and the base of which is connected to the positive terminal of bias voltage supply VB2 via the bases of PNP transistors Q14 and Q15. The negative terminal of bias voltage supply VB2 is connected to the ground. The collectors of PNP transistors Q14 and Q15 are connected to the ground. The emitter of PNP transistor Q14 is connected to the base of NPN transistor Q19, and the emitter of NPN transistor Q15 is connected to the base of NPN transistor Q20. The collectors of NPN transistors Q19 and Q20 are connected to positive power supply Vcc. The emitter of NPN transistor Q19 is connected to the ground via current source I3, and the emitter of NPN transistor Q20 is connected to the ground via current source I4. The emitter of NPN transistor Q20 is also connected to the bases of NPN transistors Q21 and Q22. The collector of NPN transistor Q21 is connected to positive power supply Vcc via resistor R3, and the collector of NPN transistor Q22 is connected to positive power supply Vcc via resistor R4. The emitters of NPN transistors Q21 and Q22 are connected to the ground via common current source I5.

The collector of NPN transistor Q22 forms an output terminal for outputting signal OUTA, and the collector of NPN transistor Q21 forms an output terminal for outputting signal OUTB.

The bases of PNP transistors Q5, Q7, Q8, Q9, and Q10 are connected one another.

Capacitor CO is inserted between the collector of NPN transistor Q1 and the collector of NPN transistor Q2 and connected thereto.

Figure 6:
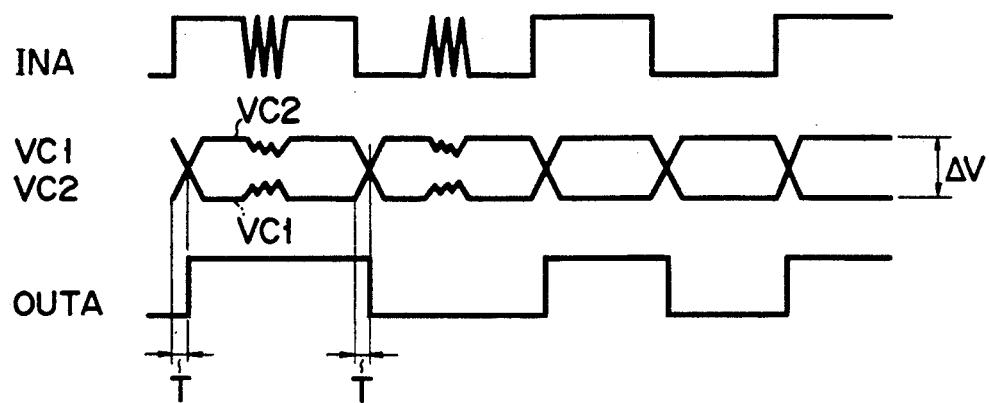
FIG. 6 shows signal charts of the FIG. 5 circuit.

The operation of the FIG. 5 circuit will now be described, with reference to the signal charts of FIG. 6.

When input signal INA is logical low, and input signal INB is logical high, transistor Q1 of differential amplifier 20 is turned off, while transistor Q2 is turned on. As a result, collector current IO flows through transistor Q2. Capacitor CO is charged by the constant current IO/2 flowing through transistor Q8. In turn, voltage VC1 at the terminal of capacitor CO, which is connected to the collector of transistor Q1 begins to rise. Voltage VC2 at the terminal of capacitor CO, which is connected to the collector of transistor Q2 begins to fall. Finally, terminal voltages VC1 and VC2 are clamped by clamp circuit 40 at the potentials of logical high and logical low, respectively, and are given by $$VC1 = VB2 + VBE15 \tag{1}$$

$$VC2 = VB2 + VBE16 + VBE17 - VBE11 + \Delta V + VBE18 - VBE12 \tag{2}$$

where VBE11, VBE12, VBE15, VBE16, VBE17, and VBE18 are respectively the base-emitter voltages of transistors Q11, Q12, and Q15 to Q18, and ΔV is the voltage drop across resistor R2, caused by constant current I2.

Assuming that pairs of transistors Q15 and Q16, Q17 and Q18, and Q11 and Q12 each have the same characteristics, and that constant current sources I1 and I2 also have the same characteristics, the voltage difference VC1−VC2 across capacitor CO when the clamp circuit operates is expressed as $$VC2 - VC1 = \Delta V \tag{3}$$

The clamp voltage across capacitor CO is determined by only the values of resistor R2 and constant current I2.

When input signal INA is logical high, and input signal INB is logical low, transistor Q1 of differential amplifier 20 is turned on, while transistor Q2 is turned off. As a result, collector current IO flows through transistor Q1. Capacitor CO is charged by the constant current IO/2 flowing through transistor Q7. In turn, voltage VC1 at the terminal of capacitor CO, which is connected to the collector of transistor Q1 begins to rise, and voltage VC2 at the terminal of capacitor CO, which is connected to the collector of transistor Q2 begins to fall. Finally, terminal voltages VC1 and VC2 are clamped by clamp circuit 40 at the potentials of logical high and logical low, as given by equations (1) and (2), respectively.

Subsequently, every time input signals INA and INB change between the logical high level and the logical low level, the levels of terminal voltages VC1 and VC2 alternately fluctuate, each within the difference $\Delta V$.

Comparator 50 inverts the logical states of output signals OUTA and OUTB when the terminal voltages VC1 and VC2 of capacitor CO coincide with each other.

Since the voltage across capacitor is $\Delta V$, charge quantity q of capacitor CO when it is charged is given by $$q = CO \cdot \Delta V \tag{4}$$

Capacitor CO is charged by the current IO/2 during period T which starts when terminal voltages VC1 and VC2 change and which ends when those voltages are equal. The charge quantity q of capacitor CO, when capacitor CO is charged during period T, is given by $$q = \int_0^T (IO/2)t = (IO/2)T \tag{5}$$

From the equations (4) and (5), the equation $$T = (2CO/IO)\Delta V \tag{6}$$

is obtained. The period T in the above equation (6) is the time delay of the output signal of the delay circuit to the input signals INA and INB, and is a function of IO and $\Delta V$. Since it is technically easy to make factors IO and $\Delta V$ independent on temperature variation, the time delay T can be kept constant. To set the time delay T to a desired value, it is only needed to use external resistor R1 of an appropriate resistance and constant current IO of an appropriate current.

Figure 7:
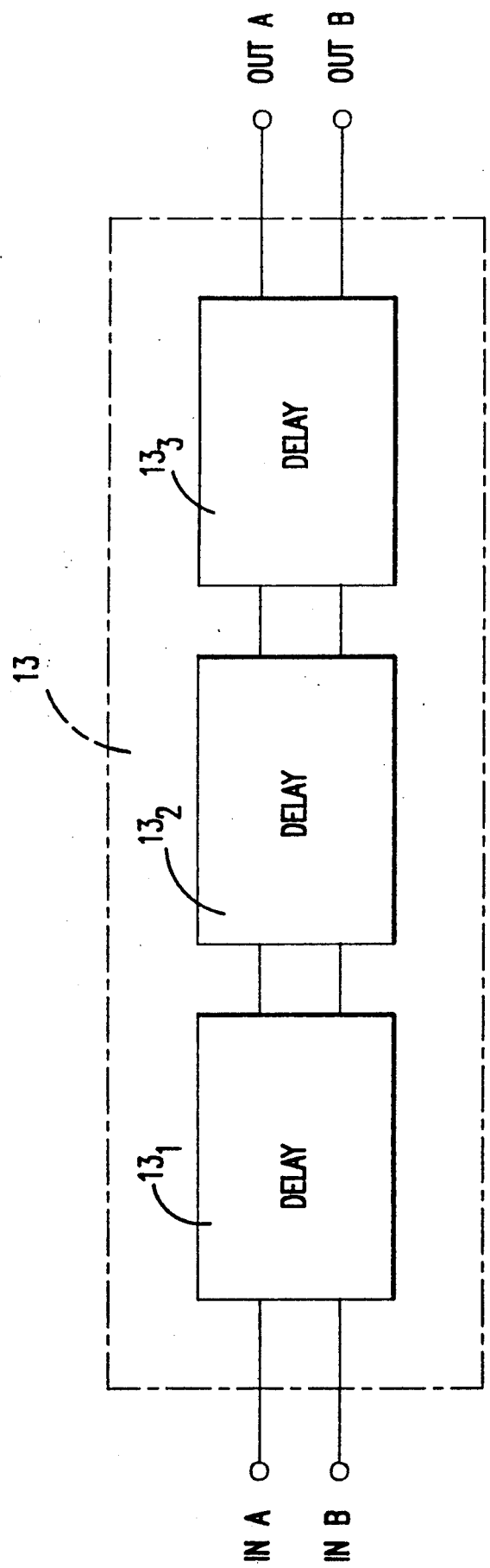
FIG. 7 shows a plurality of delay circuits connected in a cascade fashion.

Generally, a pulse delay circuit cannot delay the input signal exceeding its ½ pulse width of the input signal. Therefore, when the delay exceeding the ½ pulse width of the input signal is required for a particular use, a plurality of the delay circuits ($13_1$, $13_2$, $13_3$) shown in FIG. 5 must be connected in cascade fashion, as seen in FIG. 7.

Since the signal processing circuit of FIG. 3, uses a digital—as opposed to an analog—delay circuit to perform signal delay, no analog filters are then required, unlike the prior signal processing circuit. This makes it possible for the entire signal processing circuit, with the exception of variable resistor R1, to be fabricated in a one-chip manner. The effects of this embodiment are a significant, and desirable, decrease in the area of the wiring board taken up by the signal processing circuit, and a more simplified circuit design.

As can be seen from the foregoing description, according to this invention, a signal processing circuit based on the $\Delta V$ system is provided, which can be built into the IC circuit and is simple in design.

What is claimed is:

1. A signal processing circuit comprising:
    means for differentiating an analog signal to generate complementary output signals;
    means for converting said complementary output signals from said differentiating means into complementary digital signals and for comparing said complementary digital signals with each other; and
    digital delay means for delaying said output digital signal of said converting and comparing means by a predetermined period of time.

2. The signal processing circuit according to claim 1, wherein said digital delay means includes:
    first and second transistors, each of the first and second transistors having an emitter, the emitters being connected together, and a base for receiving complementary pulse signals to be delayed;
    a first constant current source connected to said emitters of said first and second transistors, said first constant current source feeding a first constant current;
    a capacitor connected between collectors of said first and second transistors;
    second and third constant current sources connected to the collectors of said first and second transistors, respectively, each of the second and third constant current sources supplying constant currents having values which are one-half of the first constant current of said first constant current source;
    clamp means for clamping a potential difference across said capacitor to below a predetermined value; and
    differential amplifier means for amplifying the potential difference between ends of said capacitor.

3. The signal processing circuit according to claim 1, wherein said digital delay means comprises a plurality of digital delay circuits connected in a cascade fashion.

4. The signal processing circuit according to claim 2, wherein said capacitor includes first and second terminals and said clamp means comprises:
    a first PNP transistor whose emitter is connected to a first power source potential and whose collector is connected to a second power source potential;
    a bias voltage source connected between the base of said first PNP transistor and said second power source potential;
    a second PNP transistor whose emitter is connected to said first power source potential and whose collector is connected to said second power source potential;
    a first current source for supplying an electric current to said second PNP transistor;
    a first NPN transistor whose collector is connected to said first power source potential, whose base is connected to said emitter of said second PNP transistor, and whose emitter is connected to said second power source potential through a resistor;
    a second current source for supplying an electric current to said first NPN transistor;
    a third PNP transistor whose emitter is connected to said first power source potential, whose collector is connected to said second power source potential, and whose base is connected to said emitter of said first NPN transistor via said resistor;
    a second NPN transistor whose collector is connected to said first power source potential, whose emitter is connected to said first terminal of said capacitor, and whose base is connected to said emitter of said third PNP transistor; and a third NPN transistor whose collector is connected to said first power source potential, whose emitter is connected to said second terminal of said capacitor, and whose base is connected to said emitter of said third PNP transistor.

5. A signal processing circuit comprising:

means for differentiating an analog signal to generate complementary output signals;

means for converting the complementary output signals from the differentiating means into complementary digital signals and for comparing the complementary digital signals with each other; and digital delay means for delaying the output digital signal of the converting and comparing means by a predetermined period of time; wherein the digital delay means includes:

first and second transistors, each of the first and second transistors having an emitter, the emitters being connected together, and a base for receiving complementary pulse signals to be delayed;

a first constant current source connected to the emitters of the first and second transistors, the first constant current source feeding a first constant current;

a capacitor connected between collectors of the first and second transistors;

second and third constant current sources connected to the collectors of the first and second transistors, respectively, each of the second and third constant current sources supplying constant currents having values which are one-half of the first constant current of the first constant current source;

clamp means for clamping a potential difference across the capacitor to below a predetermined value; and differential amplifier means for amplifying the potential difference between ends of the capacitor.

6. A signal processing circuit comprising:

means for differentiating an analog signal to generate complementary output signals;

means for converting the complementary output signals from the differentiating means into complementary digital signals and for comparing the complementary digital signals with each other; and digital delay means for delaying the output digital signal of the converting and comparing means by a predetermined period of time; wherein the digital delay means includes:

first and second transistors, each of the first and second transistors having an emitter, the emitters being connected together, and a base for receiving complementary pulse signals to be delayed;

a first constant current source connected to the emitters of the first and second transistors, the first constant current source feeding a first constant current;

a capacitor connected between collectors of the first and second transistors;

second and third constant current sources connected to the collectors of the first and second transistors, respectively, each of the second and third constant current sources supplying constant currents having values which are one-half of the first constant current of the first constant current source;

clamp means for clamping a potential difference across the capacitor to below a predetermined value; and differential amplifier means for amplifying the potential difference between ends of the capacitor, the capacitor including first and second terminals; and wherein the clamp means includes:

a first PNP transistor whose emitter is connected to a first power source potential and whose collector is connected to a second power source potential;

a bias voltage source connected between the base of the first PNP transistor and the second power source potential;

a second PNP transistor whose emitter is connected to the first power source potential and whose collector is connected to the second power source potential;

a first current source for supplying an electric current to the second PNP transistor;

a first NPN transistor whose collector is connected to the first power source potential and whose base is connected to the emitter of the second PNP transistor, and whose emitter is connected to the second power source potential through a resistor;

a second current source for supplying an electric current to the first NPN transistor;

third PNP transistor whose emitter is connected to the first power source potential, whose collector is connected to the second power source potential, and whose base is connected to the emitter of the first NPN transistor via the resistor;

a second NPN transistor whose collector is connected to the first power source potential, whose emitter is connected to the first terminal of the capacitor, and whose base is connected to the emitter of the third PNP transistor; and a third NPN transistor whose collector is connected to the first power source potential, whose emitter is connected to the second terminal of the capacitor, and whose base is connected to the emitter of the third PNP transistor.

* * * * *